（12）United States Patent
Reichert et al.

(10) Patent No.: US 7,673,199 B2
(45) Date of Patent: Mar. 2, 2010

(54) MULTI-STREAM INTERFACE FOR PARALLEL TEST PROCESSING

(75) Inventors: Peter A. Reichert, Thousand Oaks, CA (US); Craig E. Robertson, Winnetka, CA (US); George W. Conner, Camarillo, CA (US)

(73) Assignee: Teradyne, Inc., North Reading, MA (US)

( * ) Notice: Subject to any disclaimer, the term of this patent is extended or adjusted under 35 U.S.C. 154(b) by 1064 days.

(21) Appl. No.: 11/346,801

(22) Filed: Feb. 3, 2006

(65) Prior Publication Data

US 2007/0208985 A1    Sep. 6, 2007

(51) Int. Cl.
*G01R 31/28* (2006.01)

(52) U.S. Cl. .................................................. 714/724

(58) Field of Classification Search ................ 714/724, 714/725, 726, 733, 734, 742, 799, 30, 38, 714/48; 702/108, 118; 716/4
See application file for complete search history.

(56) References Cited

U.S. PATENT DOCUMENTS

| | | | | |
|---|---|---|---|---|
| 5,243,273 A | * | 9/1993 | McAuliffe et al. | 714/724 |
| 5,541,862 A | * | 7/1996 | Bright et al. | 702/122 |
| 5,761,453 A | | 6/1998 | Anderson et al. | 395/306 |
| 6,260,159 B1 | | 7/2001 | Garnett et al. | 714/15 |
| 6,295,571 B1 | | 9/2001 | Scardamalia et al. | 710/129 |
| 6,425,021 B1 | | 7/2002 | Ghodrat et al. | 710/22 |
| 6,671,760 B1 | | 12/2003 | Kawasaki et al. | 710/106 |
| 6,738,845 B1 | | 5/2004 | Hadwiger et al. | 710/240 |
| 6,748,479 B2 | | 6/2004 | Sano et al. | 710/316 |
| 6,823,402 B2 | | 11/2004 | Smith et al. | 710/22 |
| 6,871,237 B2 | | 3/2005 | Han et al. | 710/5 |
| 6,880,035 B1 | | 4/2005 | Groeger et al. | 710/308 |
| 2005/0039079 A1 | | 2/2005 | Higashi et al. | |
| 2005/0122991 A1 | | 6/2005 | Golasky et al. | |

FOREIGN PATENT DOCUMENTS

WO     WO 2005013143       2/2005

OTHER PUBLICATIONS

International Search Report and the Written Opinion dated Oct. 30, 2007, 19 pages.

* cited by examiner

*Primary Examiner*—Phung M Chung
(74) *Attorney, Agent, or Firm*—Foley & Lardner LLP; Joseph M. Maraia

(57) ABSTRACT

Data can be processed in automatic test equipment by dividing the test sites into groups and processing each group using a corresponding processor in a group of processors. Sections of the test equipment can communicate via a tester bus to a particularly designed multi-stream switch. The multi-stream switch can communicates with a plurality of processors via a plurality of processor busses. Each of the processors can run a separate instance of test software without interfering with software running on any other of the processors. The inventive protocol can be embodied essentially in hardware that can be adapted to an existing infrastructure without requiring substantial modifications of existing hardware or software.

8 Claims, 8 Drawing Sheets

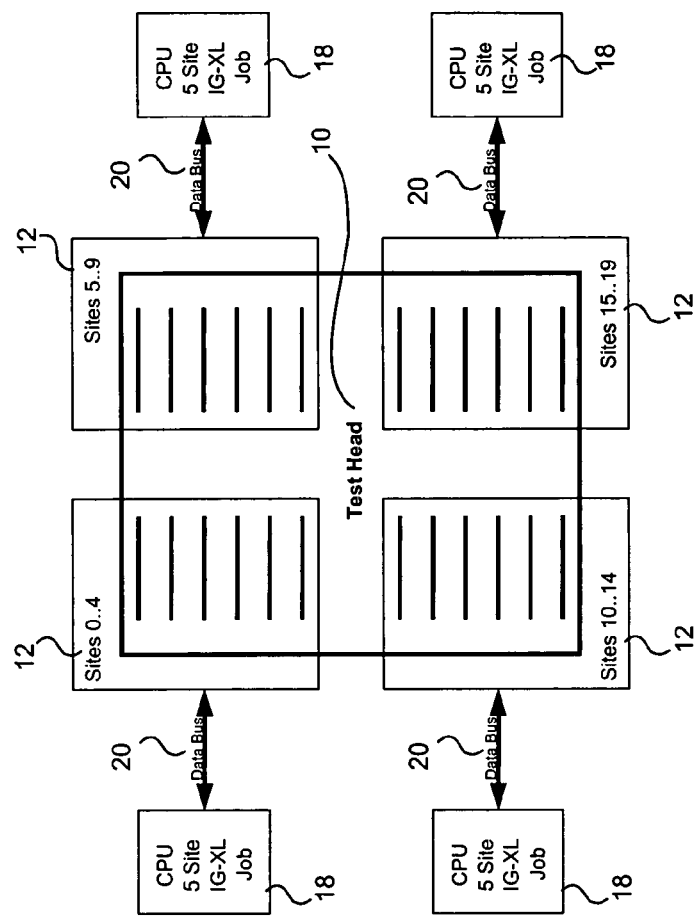
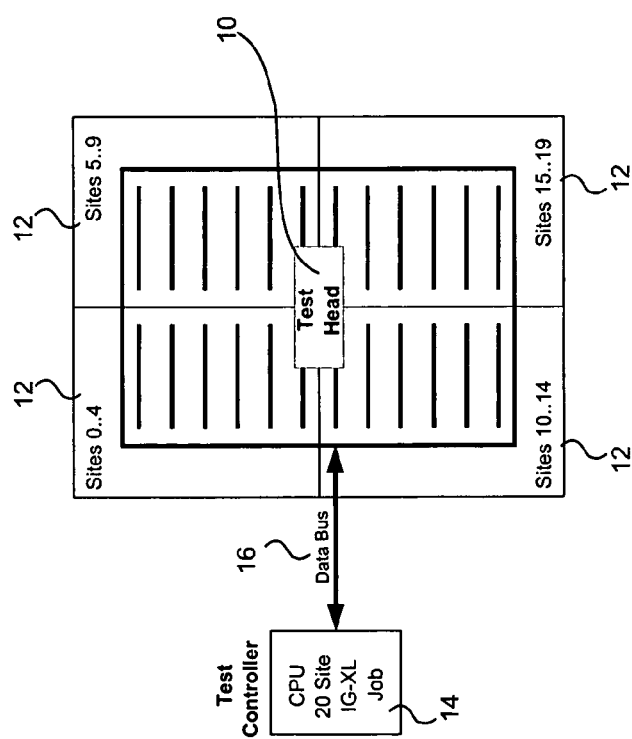
FIG. 1B
FIG. 1A
Prior Art

MULTI-STREAM INTERFACE FOR PARALLEL TEST PROCESSING

FIELD OF THE INVENTION

The present invention relates generally to the field of interfacing computers to test equipment.

BACKGROUND

Automatic test equipment is commonly used to test devices and components. Many types of automatic test equipment are interfaced with a host computer which controls the test equipment, provides data to the test equipment and/or acquires data from the test equipment. As devices become more complex, an increasing amount of data must be communicated to and from an increasing number of test sites, i.e., devices under test. Therefore, an increasing amount of data must be sent between the test equipment and the host computer.

Automatic testing of digital devices can be very processor-intensive and can typically require one or more high bandwidth channels for communicating between a host computer and test equipment. In some commonly used test equipment, the speed of testing is limited by the bandwidth of this channel and/or the processing capacity of the host computer.

Some test systems employ a separate processor that is permanently connected to each instrument slot. These test systems do not allow the flexibility of changing the interface between processors and instrument slots to allow multiple processors to communicate with a single instrument slot or to assign processors to particular sites, for example. In certain test environments, or when testing certain devices, this type of inflexibility can dramatically limit tester performance. Other systems allow the user to change the assignment of instrument slots to computers, but do not allow multiple computers to talk to one instrument slot.

A large number of expensive testers that were configured using a single processor or multiple processors are in use throughout the world. An existing infrastructure including test instruments and test software has been designed and implemented to run on or in conjunction with these testers.

SUMMARY OF THE INVENTION

Various embodiments of the present invention provides a method and/or apparatus for processing data in automatic test equipment by dividing the test sites into groups and processing each group using a corresponding processor in a group of processors. Sections of the test equipment, such as instrument slots, for example, can be assigned to corresponding test sites in a device under test. The test equipment sections can communicate, via a backplane, for example, through a tester data bus to a multi-stream switch. The multi-stream switch can communicate with a plurality of processors via a plurality of processor busses.

A multi-streaming method and apparatus according to illustrative embodiments of the present invention, allow multiple instances of test software, such as IG-XL, for example, to communicate with separate sections of the same tester. The inventive protocol can be embodied essentially in hardware that can be adapted to an existing infrastructure without requiring substantial modifications to existing hardware or software.

An illustrative embodiment of the present invention provides a tester processing system including a tester data bus, a multi-stream switch in communication with the tester data bus and a plurality of processors in communication with the multi-stream switch. In the illustrative embodiment, one of the plurality of processors can be a primary processor with a user interface. The primary processor can be used for single processor test operations such as for running tests designed for legacy equipment in which only one processor was used.

In the illustrative embodiment, each of the plurality of processors can run a separate instance of tester software. The multi-stream switch can allow each instance of the test software to communicate with corresponding sections of a tester through the tester data bus without interfering with instances of the test software running on other processors. For example, in an illustrative embodiment, the multi-stream switch can convert streams from the plurality of processors to a protocol compatible with test equipment that is designed for communication with a single processor.

Another illustrative embodiment of the present invention provides a multi-stream switch including a tester port, a plurality of processor ports and protocol circuitry in communication with the tester port and in communication with the plurality of processor ports. In the illustrative embodiment, the protocol circuitry can direct multiple streams between each of the plurality of processor ports and the tester port. The multi-stream switch can include an electrical-optical interface converter in communication with the tester data bus port for optical communication with a tester.

Another illustrative embodiment of the present invention provides a method for testing a device by connecting at least one test instrument slot to a multi-stream switch through a tester data bus and connecting a plurality of processors to the multi-stream switch through a plurality of processor data buses. In an alternative embodiment of the invention, one or more test instrument slots can be subdivided into portions wherein each portion can communicate with a separate processor.

Another illustrative embodiment of the invention provides a method for interfacing a plurality of processors to a single tester by running separate instances of tester software on a plurality of processors, buffering and steering multiple streams from/to the plurality of processors to/from the single tester. The illustrative method can include constructing extended tester protocol frames which include stream identifying information and which appear to the tester to be standard tester protocol frames. Within the extended tester protocol frames, streams can be identified by a stream number or by their position in the frame.

According to the various embodiments of the present invention, tests can be run using one or more processors and can run different numbers of processes without requiring any change in hardware configuration. Therefore, test jobs that were designed for use with a single processor can run on test hardware that is configured according to the present invention without requiring any changes thereto.

BRIEF DESCRIPTION OF THE DRAWINGS

The present invention will be more fully understood from the following detailed description of illustrative embodiments taken in conjunction with the accompanying drawings in which:

FIG. 1A is a schematic block diagram of a test head having a plurality of test instrument slots interfaced to a single test processor according to the Prior Art;

FIG. 1B is a schematic block diagram of a test head having a plurality of test instrument slots interfaced to a plurality of test processors according to an illustrative embodiment of the present invention;

DETAILED DESCRIPTION

Figure 2:
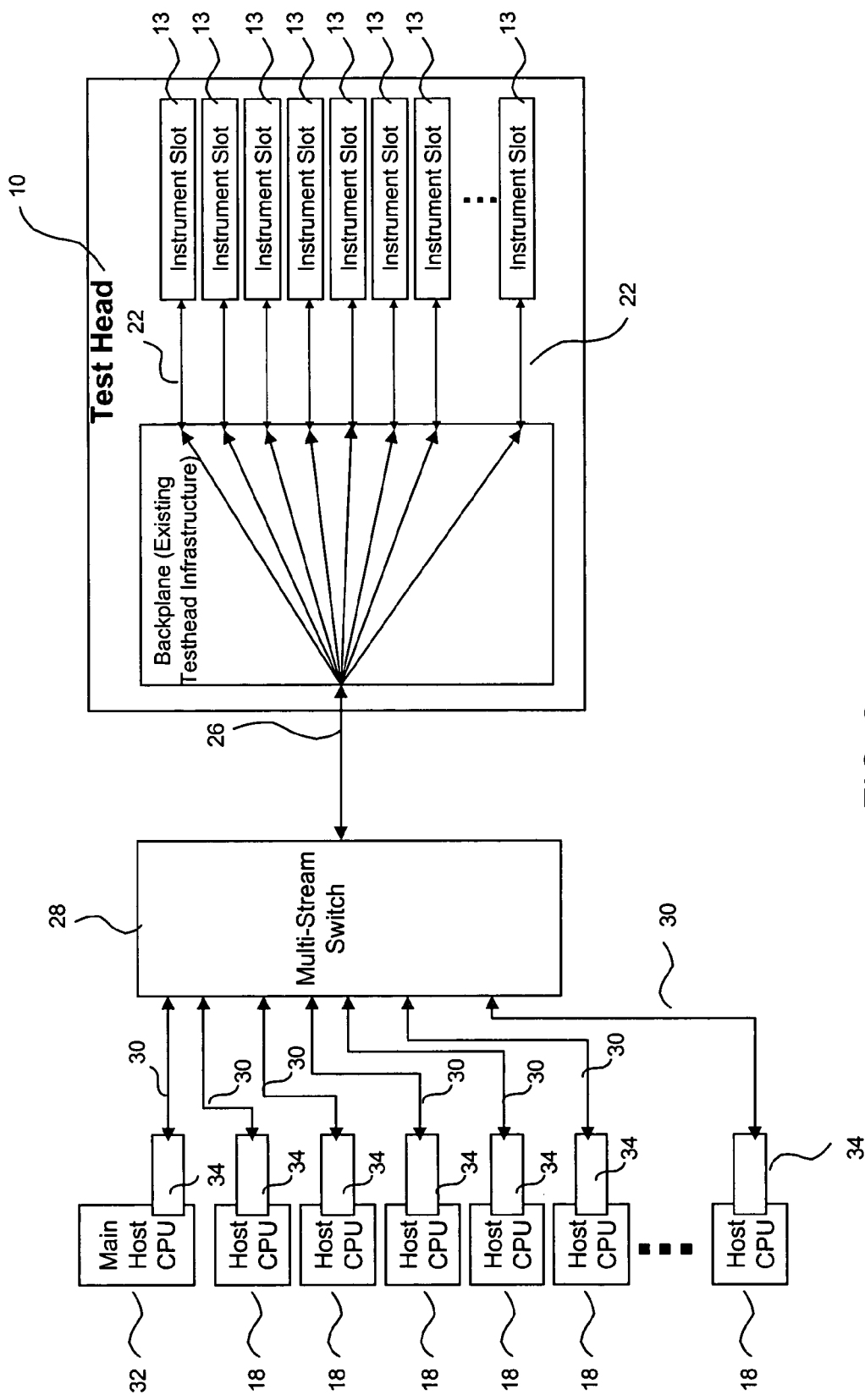
FIG. 2 is a schematic block diagram of a tester system including a plurality of test instrument slots interfaced to a plurality of test processors through a multi-stream switch according to an illustrative embodiment of the present invention.

Computers are used in automatic test equipment for controlling test instrumentation and for collecting data from the test instrumentation. Complex test equipment, such as equipment for testing integrated circuits for example, can include a large number of instruments of various types which are each interfaced through the test equipment to a host central processing unit (CPU). For illustrative purposes, test equipment having a test head that is configured to test a plurality of test sites and which is interfaced to a single host CPU is described with reference to FIG. 1A. It should be understood that a test site is a device under test that can be accessed by test equipment.

A test head 10 in an illustrative embodiment of the invention can communicate with a plurality of test sites 12. It should be understood by persons having ordinary skill in the art that the term "test head" has historically been used to describe the portion of automatic test equipment which interfaces with a device under test or includes test instrumentation wherein the instrumentation interfaces directly with a plurality of devices under test. Although the term test head is often used to describe an interface portion of a large mainframe-based tester, it should be understood that highly integrated test systems for very large scale integrated circuits (VLSIs) can now be made on one or more circuit boards wherein no mainframe or associated interconnection cabling is needed. In such systems, the term "test head" can be used to describe the circuit board or boards that includes the entire tester. It should be understood that a tester can include one or more test heads.

The test head 10 illustrated in FIG. 1A includes 20 sites 12 that are in communication with a single test processor 14 through a processor data bus 16. Persons having ordinary skill in the art should appreciate that a test processor as the term is used herein can be virtually any type of central processing unit such as a general purpose processor disposed on one or more boards and/or in one or more housings or can include one or more industrial computers, personal computers or the like.

The parallel test efficiency of automatic test equipment is substantially improved by utilizing a plurality of test processors 18 according to illustrative embodiments of the present invention as described with reference to FIG. 1B. A test head 10 in communication with twenty test sites 12 is essentially the same or analogous to the test head that was described with respect to FIG. 1A. Test sites 12 are divided into four groups having five test sites 12 in each group. A corresponding test processor 18 can communicate with each of the four groups through a corresponding processor bus 20.

An illustrative embodiment of automatic test equipment having a plurality of test processors is described with reference to FIG. 2. A test head 10 can include a plurality of instrument slots 13. Persons having ordinary skill in the art should understand that each instrument slot 13 can be designated to communicate with one or more test sites 12 in some configurations. (FIGS. 1A and 1B). In other configurations, a number of instrument slots or portions of instrument slots can be designated to communicate with a single test site. Each instrument slot 13 can be connected through an instrument slot data bus 22 through a tester data bus 26 to a multi-stream switch 28. A plurality of processors 18 and a main processor 32 can be connected to the multi-stream switch 28 through a plurality of processor data buses 30. In illustrative embodiments, the processor data buses 30 can each be connected to a corresponding processor 18 through an interface card 34 as known in the art. The main processor 32 and the plurality of processors 18 can each run a separate instance of test software.

The multi-stream switch 28 steers data bus traffic from/to the multiple processors to/from a test head 10. The multi-stream switch 28 allows virtually any combination of connections between the plurality of processors 18 and the instrument slots 13 so that particular processors 18 can be assigned to process data for particular instrument slots 13 as desired to optimize efficiency of a particular test. The multi-stream switch 28 can also prevent separate instances of test software that are running on the plurality of processors 18 and/or the main processor 32 from interfering with each other. Persons having ordinary skill in the art should understand that the term "stream" is used herein as known in the art and generally refers to all or a portion of a context or conversation between electronic equipment, components, software and/or devices. Although the invention is not so limited, illustrative embodiments described herein, the term "stream" refers generally to data bus traffic that is related to a single instance of tester software, such as IG-XL software, for example.

In an illustrative embodiment of the present invention, the multi-stream switch 28 is designed to be transparent to existing test equipment in the field by appearing to be a single computer from the point of view of the existing test equipment. Accordingly, only minor hardware or software modifications to equipment in the field should be necessary to interface existing test heads with a plurality of processors in a reconfigurable manner according to this illustrated embodiment of the present invention.

A multi-stream switch 28 designed according to illustrative embodiments of the present invention is described with reference to FIG. 3. Persons having ordinary skill in the art should understand that the present invention can be adapted for use in test equipment that uses different protocols and/or that is produced by different vendors within the scope of the present invention.

Figure 3:
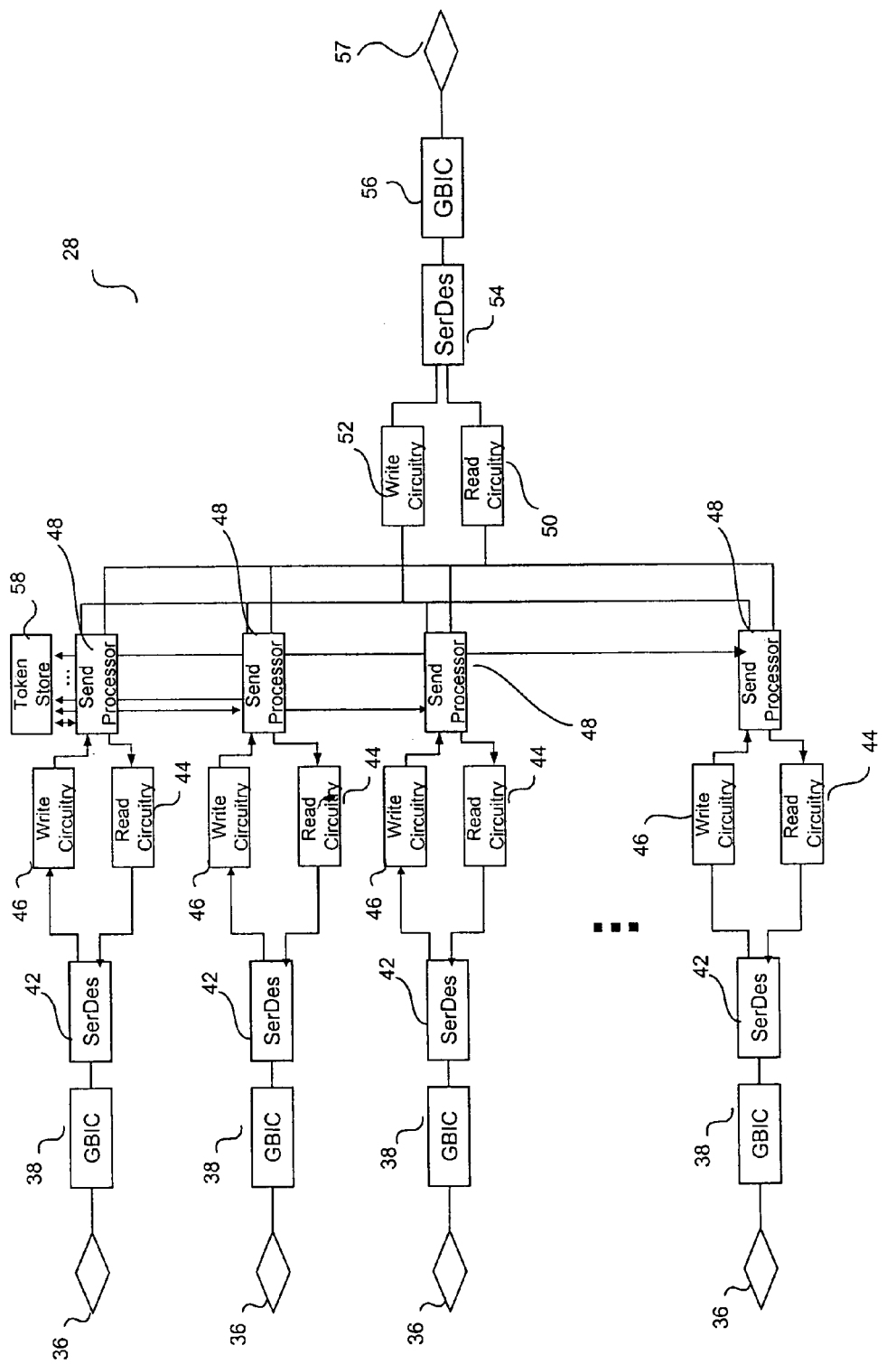
FIG. 3 is schematic block diagram of a multi-stream switch according to illustrative embodiments of the present invention.

As shown in FIG. 3, the illustrative multi-stream switch 28 includes a plurality of ports 36 for connection to a plurality of corresponding processor data buses 30 (FIG. 2). Each port 36 directs a corresponding stream to an electrical/optical interface converter 38. The electrical/optical interface converter 38 can be a gigabit interface converter (GBIC) as known in the art. In the illustrative embodiment, the electrical/optical interface converters 38 can be optical or copper. Each electrical/optical interface converter 38 can be used in communication with a serialization/de-serialization portion (SerDes) 42 which can direct write portions of each stream to write circuitry 46 and can direct read portions of each stream to read circuitry 44. Read circuitry 44 and write circuitry 46 for each stream can be disposed in communication with a corresponding send processor 48. It should be understood by persons skilled in the art that SerDes and GBJC are illustrative protocols and that alternative protocols, serial and/or parallel, could be used in their place within the scope of the present invention.

Although the term port is used herein generally to describe an interface between a device or component and another device or component, it should be understood by persons having ordinary skill in the art that a port as described herein can be a simple connection point to a device for input/output (I/O) thereto, such as a integrated circuit pin, or may be a multi-conductor connection point. It should be understood that a port as described herein may also be serial port, parallel port, optical port, radio frequency port, or virtually any other type of signal connection point known in the art without limitation.

Although the term "bus" is used herein in the context of a tester bus and processor buses to generally describe channels of communication between a multi-stream switch and processors or between a multi-stream switch and a tester, persons having ordinary skill in the art should understand that no particular bus design is required in the illustrative embodiments. Rather, virtually any type of communication channel known in the art having sufficient bandwidth to transmit the described streams can be used as a "bus" according to the illustrative embodiments described herein without departing from the spirit and scope of the present invention. Also, the various illustrative embodiments of the present invention do not require the type of bus or protocol used between processors and the multi-stream switch to be the same type of bus or protocol used between the multi-stream switch and tester.

According to the illustrative embodiment, the send processors 48 can buffer and throttle incoming read portions and write portions in the stream from a corresponding processor. The send processors 48 can also connect read data from the tester back to read requests from the processor and send data back to the processor. The send processors 48 can also buffer write data going to the tester and buffer read data coming from the tester. In the illustrative embodiment, the send processors 48 can also indicate packet type, request tokens for shared resources from a token store and dismantle single stream frames.

Tester data bus write circuitry 52 and tester data bus read circuitry 50 are disposed in communication with the plurality of send processors 48. In the illustrative embodiment, the tester data bus write circuitry 52 and tester data bus read circuitry 50 provide throttling into the send processor but may not provide buffering. The tester data bus write circuitry 52 and tester data bus read circuitry 50 can also build multi-stream read/write frames based on pending data from the send processors 48 and dismantle multi-stream read/write frames and send the dismantled frames to the send processors 48.

In a particular illustrative embodiment, the present invention can be implemented as an extension of an existing data busprotocol. The illustrative implementation may provide a data bus protocol extension that is compatible with old hardware. Accordingly, in such an implementation the legacy data bus hardware should ignore stream specific frames and new data bus hardware can read and/or respond to stream specific frames, although the invention is not so limited.

In the illustrative embodiment, a token store 58 can be provided in communication with the send processors 48. Data, referred to herein as "tokens," provide a method for communicating with old hardware. A token is provided for certain configurations of old hardware. Streams which communicate with such configurations must include the corresponding tokens, which are only available to the streams when the hardware is available to receive and/or respond to communications. For example, if testing software needs to use a central resource, to take a measurement, the software may not have knowledge regarding the state of the central resource. According to the illustrative embodiment, software can wait for the corresponding token (for the central resource) to become available, completely program the central resource to take the measurement, take the measurement and then release the token.

Figure 4:
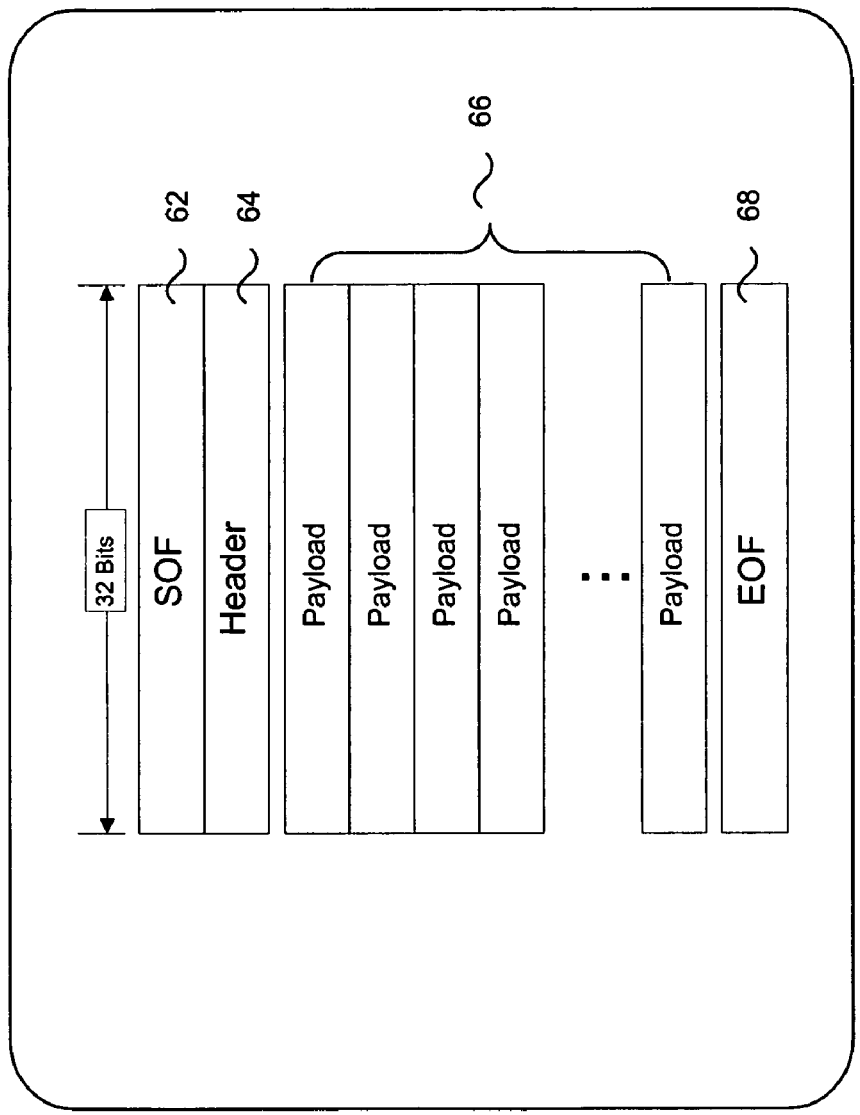
FIG. 4 is a block diagram of an illustrative data bus Frame as known in the Prior Art.

The illustrative data bus protocol is packet based. The generic form of a previously known data bus packet frame 60 is described with reference to FIG. 4. The generic data bus packet frame 60 includes a start of frame indicator 62, a header 64, one or more payload fields 66 and an end of frame indicator 68.

A new set of frame types referred to herein as Extended frames" can be defined according to illustrative embodiments of the present invention. Old data bus-specific hardware may ignore these Extended frames.

Figure 5:
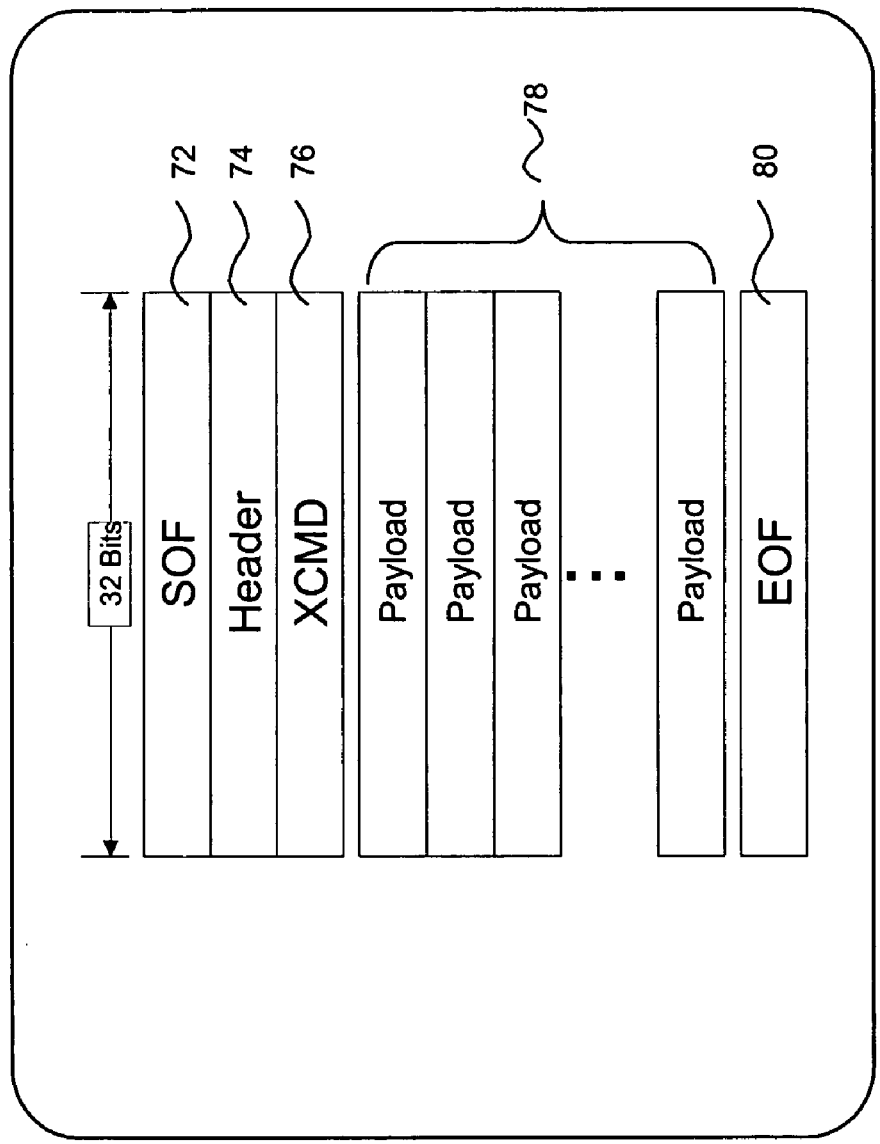
FIG. 5 is a block diagram of an Extended frame according to an illustrative embodiment of the present invention.

An Extended frame 70 according to an illustrative embodiment of the present invention is described with reference to FIG. 5. The illustrative Extended frame includes a start of frame indicator 72, a header 74, an Extended Command Field (XCMD) field 76, one or more payload fields 78 and an end of frame indicator 80.

Figure 6B:
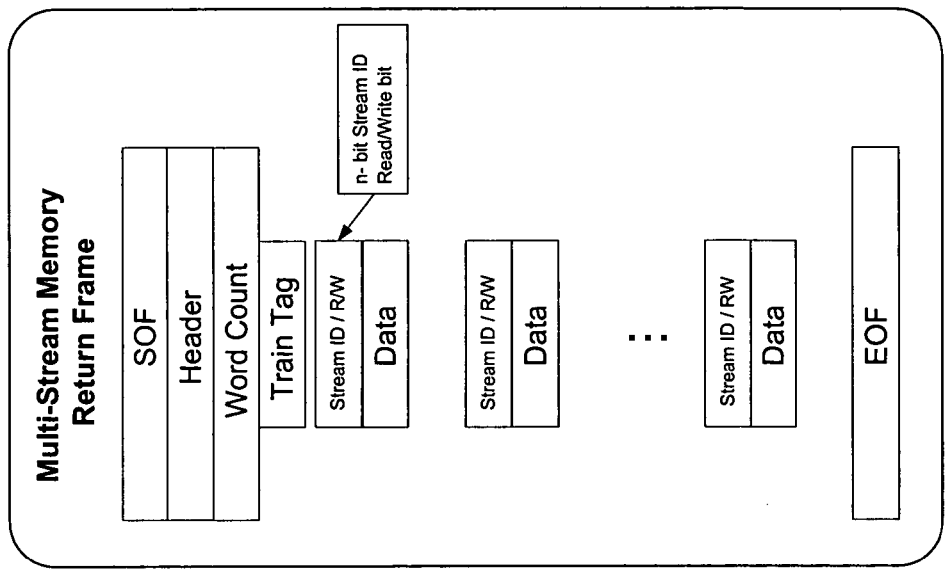
FIGS. 6A and 6B are block diagrams of an Extended multi-stream memory frame and memory return frame which identify streams by an explicit stream identification number according to an illustrative embodiment of the present invention.
Figure 6A:
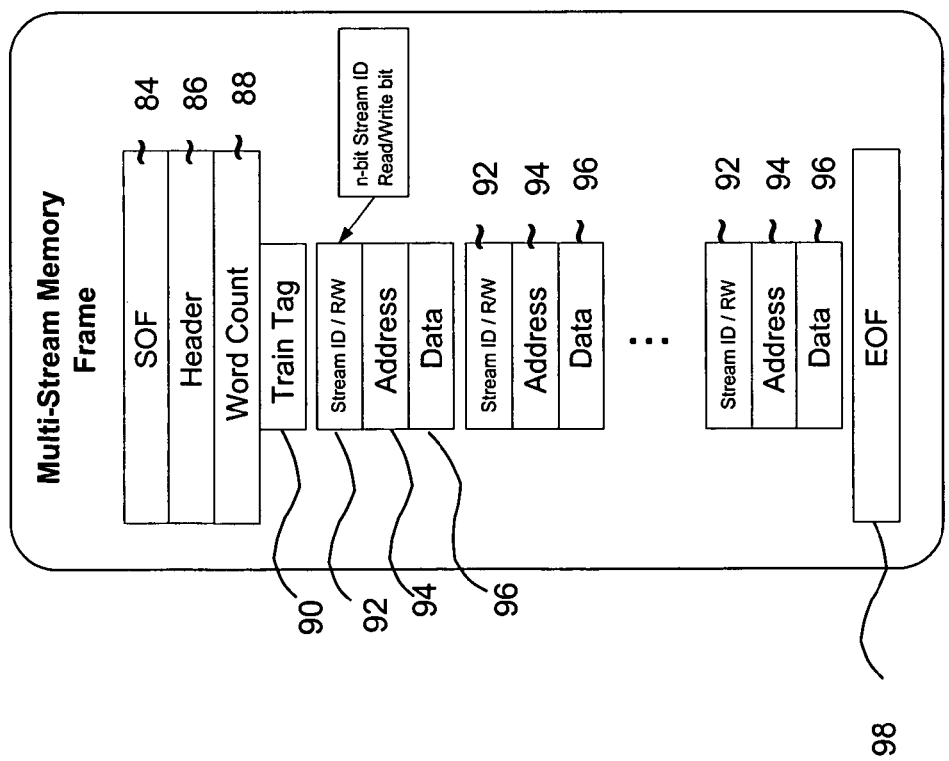

The new Extended Frames can be used to support multi-streams according to the present invention. Illustrative Extended frames 81, 82 which look like standard memory read frames to legacy equipment are described with reference to FIGS. 6A and 6B in which streams are identified by explicit stream numbers. The Extended frame 81 includes a start of frame indicator 84, a header 86, a word count field 88, a train tag 90, a stream ID/RW field 92, address fields 94 data fields 96 and an end of frame indicator 98. A corresponding Extended multi-stream memory return frame 82 is shown in FIG. 6B which has a format substantially identical to the multi-stream memory frame of FIG. 6A without address fields 94.

Figure 7B:
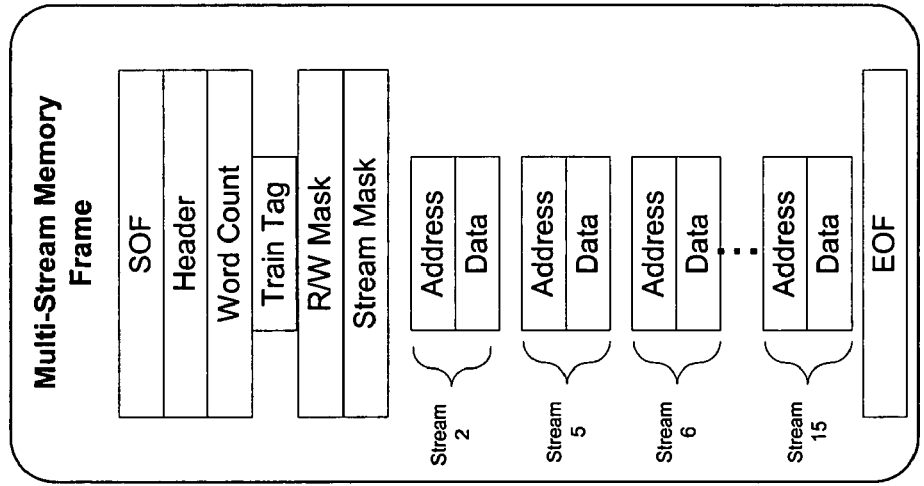
FIGS. 7A and 7B are block diagrams of an XCMD multi-stream memory frame and memory return frame which identify streams by their positioning in the frame according to an illustrative embodiment of the present invention.
Figure 7A:
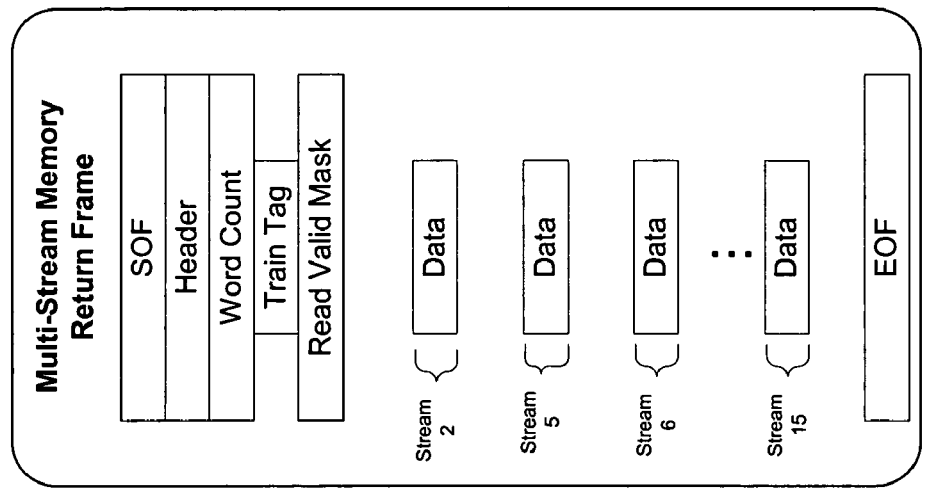

Another embodiment of a new Extended frame which supports multi-streams and identifies streams by their position within the frame is shown in FIGS. 7A and 7B. FIG. 7A is a multi-stream memory frame 100. FIG. 7B is a multi-stream memory return frame 102. In this embodiment, only streams with "1" in the stream mask are included in the frame, in this example, bit positions 2, 5, 6 and 15 would have 1s indicating those streams are present, and the remaining bit positions in the stream mask would be 0.

Figure 8A:
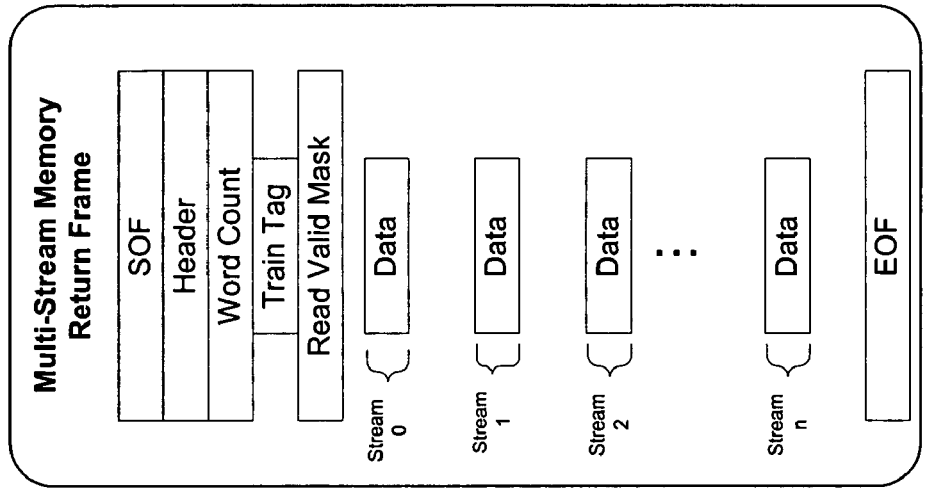
FIGS. 8A and 8B are block diagrams of an Extended multi-stream memory frame and memory return frame which identify streams by their position and provide a mask to eliminate address/data pairs for inactive streams according to an illustrative embodiment of the present invention.
Figure 8B:
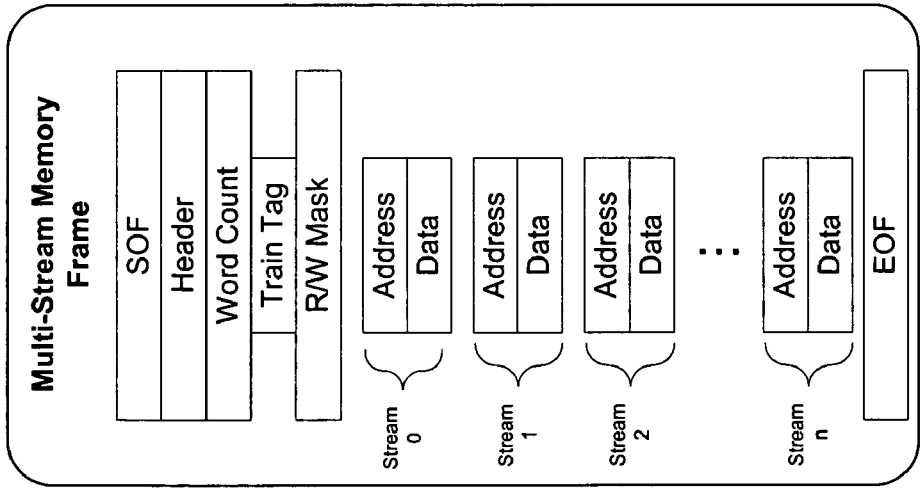

In still another embodiment of a new Extended frame which supports multi-streams and includes a CPU mask which indicates the active streams is shown in FIGS. 8A and 8B. This allows the address/data pair to be left out of the frame for inactive streams. FIG. 8A is a multi-stream memory frame 104. FIG. 8B is a multi-stream memory return frame 106. The embodiment shown in FIG. 8A and FIG. 8B shows all streams present. Read/writes are indicated by the R/W mask and inactive streams are indicated by setting the address to a pre-decided bit bucket address, such as all 1s.

Various embodiments of the present invention provide a method and apparatus for using multiple computers to control separate sections of a single tester. Each of the multiple computers can run a separate instance of test software without interfering with other instances of the test software which communicate with different sections of the tester. Various embodiments of the invention may be used by existing equipment that had been designed for single processor operations without modification.

It should be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

The invention claimed is:

1. A tester processing system comprising:
a test head including plurality of test sections;
a tester data bus in communication with the test head;
a multi-stream switch in communication with the tester data bus; and
a plurality of processor, each processor in communication with a respective processor port of the multi-stream switch;
wherein each of the plurality of processors runs a separate instance of tester software, and wherein the multi-stream switch is designed to allow each instance of the test software to communicate with corresponding test sections of the test head through the tester data bus without interfering with instances of the test software running on other processors.

2. The tester processing system according to claim 1, wherein one of the plurality of processors is a primary processor having a user interface and wherein the primary processor can be used for single processor test operations.

3. The tester processing system according to claim 1, wherein the multi-stream switch converts streams from the plurality of processor to a protocol usable with test equipment that is designed for communication with a single processor.

4. The tester processing system according to claim 1, wherein the test head comprises one or more instrument slots and wherein each instance of the test software is assigned to one or more portions of corresponding instrument slots.

5. A method for testing a device, comprising:
connecting at least one portion of at least one instrument slot of a test head to a multi-stream switch through a tester data bus;
connecting a plurality of processors to the multi-stream switch through a plurality of processor data buses; and
running separate instances of tester software on the plurality of processors to test the device.

6. The method according to claim 5, further comprising converting streams from the plurality of processor data buses to streams suitable for the tester data bus.

7. The method according to claim 5, further comprising converting streams from the tester data bus to streams suitable for the plurality of processor data buses.

8. The method according to claim 5, further comprising communicating with a test head using a protocol that appears to the test head to be from a single processor, so as not to require modification of test equipment or software that was designed for operation with a single processor.

* * * * *